INVENTOR.
ALBERT K. WATCHER
BY WILLIAM B. DULANEY
ATTORNEYS

Dec. 11, 1951  A. K. WATCHER ET AL  2,578,113
MACHINE TOOL TRANSMISSION AND CONTROL
Filed April 10, 1947  7 Sheets-Sheet 5

INVENTOR.
ALBERT K. WATCHER.
WILLIAM B. DULANEY.
BY
ATTORNEYS

Dec. 11, 1951  A. K. WATCHER ET AL  2,578,113
MACHINE TOOL TRANSMISSION AND CONTROL
Filed April 10, 1947  7 Sheets-Sheet 6

INVENTOR.
ALBERT K. WATCHER.
WILLIAM B. DULANEY.
BY
ATTORNEYS

Patented Dec. 11, 1951

2,578,113

UNITED STATES PATENT OFFICE 2,578,113

MACHINE TOOL TRANSMISSION AND CONTROL

Albert Keith Watcher, Kenwood, and William B. Dulaney, Cincinnati, Ohio, assignors to The Cleveland Automatic Machine Company, Norwood, Ohio, a corporation of Ohio Application April 10, 1947, Serial No. 740,682

22 Claims. (Cl. 90—21)

1

This invention pertains to improvements in machine tool transmission and control mechanism. More particularly, this invention is directed to improved transmission and control mechanism for milling machines.

One of the objects of this invention is to provide an efficient electrically controlled power transmission mechanism for controlling the rate, direction, and position of the movable members of a machine tool.

A further object of this invention is to provide an improved electrically operated and controlled rate and direction transmission mechanism which is simple to set up, efficient in operation, and economical to manufacture.

And still a further object of this invention is to provide a fully electrically controlled power transmission system for a milling machine which is fully interlocked so as to avoid any possible damage to the machine upon the incorrect operation of the various control devices by the operator.

It is also an object of this invention to provide a fully electrically controlled mechanical power transmission for actuating the knee, saddle, table, and cutter spindle of a milling machine in a predetermined cyclical relationship including an arrangement of simple character for setting up the machine to function through particular operating cycles as desired.

Further features and advantages of this invention will appear from a detailed description of the drawings in which.

Figure 1:
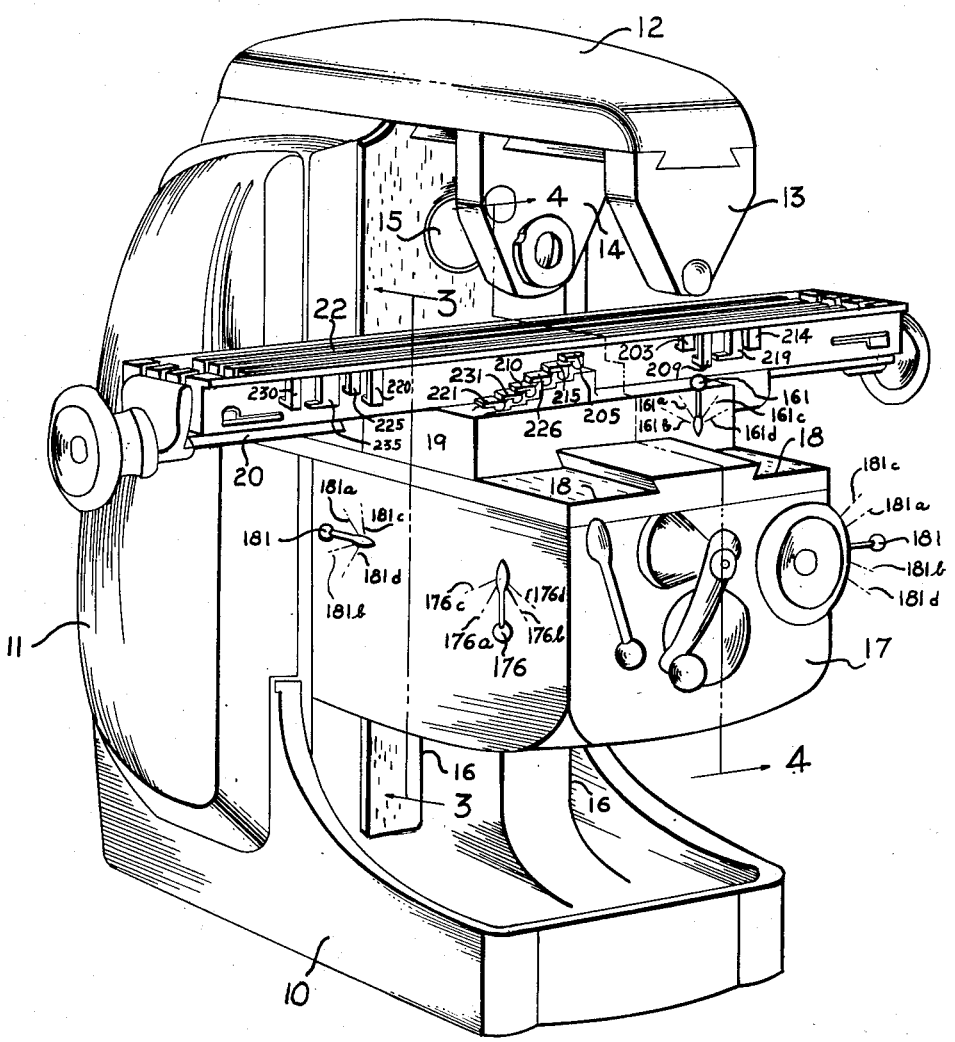
Figure 1 is a front left-hand side perspective view of a milling machine incorporating the features of this invention.

As illustrative of a machine tool to which this invention is particularly well adapted, there is shown a milling machine comprising a base 10 and having a column 11 on top of which is carried the usual over arm 12 from which depend the arbor supports 13 and 14 for carrying a suitable cutter arbor and milling cutters connected to the cutter spindle 15 journaled in the column 11. On the front of the column is mounted, on suitable guideways 16, the knee 17 having guideways 18 upon which is mounted the saddle 19. The saddle in turn has suitable guideways 20 upon which is carried the work table 21 having the usual work and fixture surface 22.

Spindle drive transmission

Figure 5:
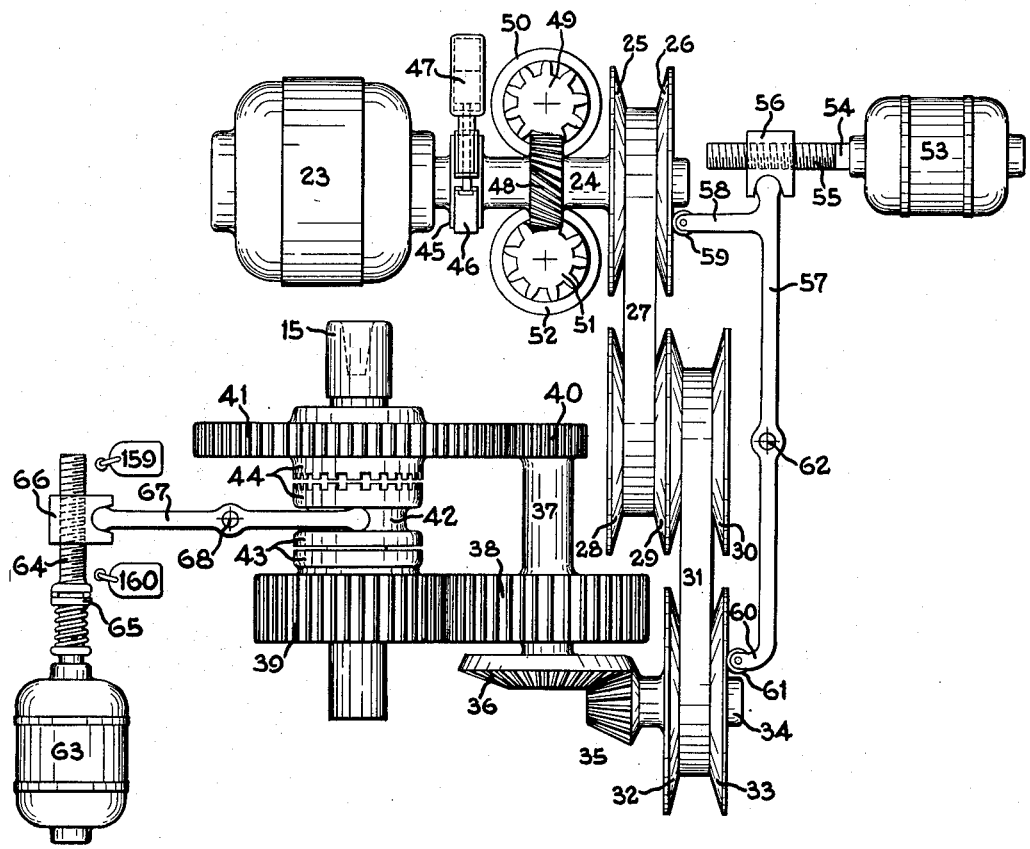
Figure 5 is a diagrammatic view of the cutter spindle drive mechanism for the milling machine.

Referring particularly to Figure 5, there is shown a preferred form of spindle drive transmission for rotating the cutter spindle 15. Power is derived from the spindle drive motor 23 having a drive shaft 24 on the outer end of which is mounted a variable pitch pulley comprising a member 25 fixed to the shaft 24 and an adjustable member 26 driven by the shaft 24 but axially slidable thereon relative to the member 25. Suitable V-belt 27 operating between the members 25 and 26 operates over the members 28 and 29 of the variable pitch idler pulley which also has a member 30 rigidly formed with the member 28, the member 29 being axially slidable relative to the members 28 and 30. A second V-belt 31 operating between the members 29 and 30 engages the members 32 and 33 of the driven pulley, the member 33 driving the pinion shaft 34 but axially slidable thereon for relative adjustment with respect to the member 32.

On the pinion shaft 34 is formed a bevel pinion 35 which in turn drives a bevel gear 36 formed on the back gear shaft 37. Back gear shaft 37 has a large high speed gear 38 constantly in mesh with a spindle gear 39 journaled on the spindle 15. The back gear shaft 37 also has a small gear 40 which in turn drives the low speed gear 41 journaled on the work spindle 15. A clutch spool 42 axially slidable on the spindle 15 but mounted in driving engagement therewith has a friction clutch 43 for interengaging drive from the gear 39 through the clutch spool 42 to the spindle 15. A positive jaw clutch 44 is also provided between the spool 42 and the gear 41 so that the clutch may be moved to effect a positive driving engagement of the gear 41 to the spindle 15.

The spindle drive motor shaft 24 is provided with a brake drum 45 about which is provided a brake band 46 operable by a suitable actuating member 47 so that the spindle drive motor shaft 24 and the transmission may be quickly brought to a stop when the motor 23 is de-energized. Power take-off from a spiral gear 48, a mating gear 49 of the coolant pump 50, and to a gear 51 of the lubricating pump 52 provides means to supply the machine with coolant and lubricating oil whenever the spindle drive motor is operating.

Infinitely variable speed rate changes may be effected in the work spindle by adjusting the variable pitch belt drive 27—31 by means of the electrically operated control motor or spindle speed regulator 53 which has a shaft 54 upon which is formed a thread 55 operating in a nut 56 connected to the lever 57 which lever has a projecting arm 58 and roller 59 engaging the member 26 of the variable pitch pulley 25—26 and has an arm 60 and a roller 61 engaging the member 33 of the variable pitch pulley 32—33, the whole lever being pivotally mounted on a suitable shaft 62 carried in the column of the milling machine. Thus, by energizing the motor 53 in one direction or other, the nut may be moved back and forth to cause rocking action of the lever 57 on the pivot 62 to relatively adjust the variable pitch pulleys 25—26 and 32—33 to vary the speed rate between the motor shaft 24 and the pinion shaft 34 in an infinitely variable manner.

The back gear and high speed clutch spool 42 is shifted by means of the actuator motor 63 which drives the operating screw 64 through an overload clutch 65, the screw 64 in turn operating in a nut 66 which is connected to an operating lever 67 pivotally mounted on a suitable shaft 68 carried in the milling machine column, the lever 67 engaging the spool 42 so that when the motor 63 is energized in one direction or the other, the clutch may be shifted to the high speed position of engagement of the friction clutch 43 or to the low speed drive position of engagement of the jaw clutch 44.

*Feed and rapid traverse tranmission mechanism*

Figure 6:
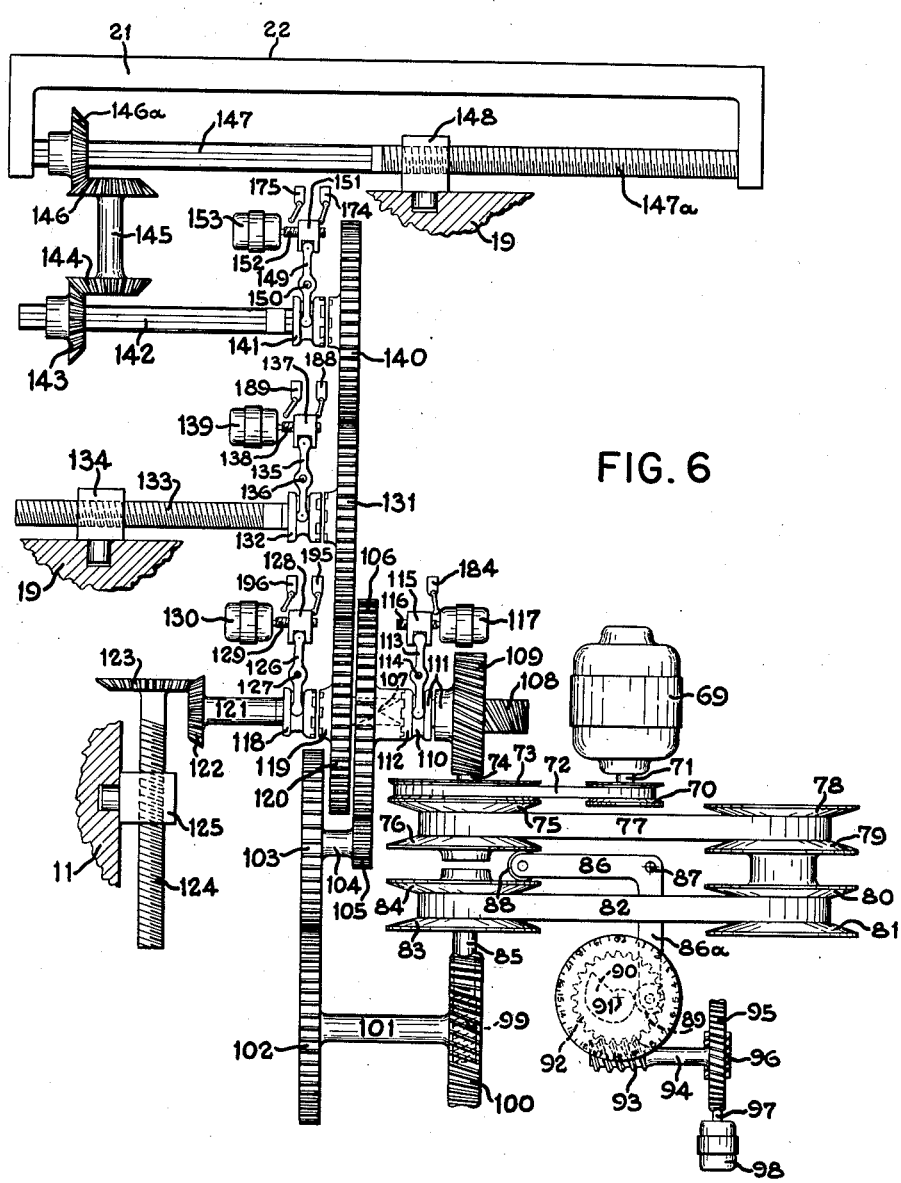
Figure 6 is a diagrammatic view of the transmission drive mechanism for the knee, saddle, and table of the milling machine.

The feed and rapid traverse drive transmission for actuating the knee, saddle, and table mechanism of the milling machine is shown diagramatically in Figure 6. The drive power for actuating these members is obtained from the feed and rapid traverse drive motor 69 which is appropriately mounted in the knee 17 of the milling machine which has a driving pulley 70 mounted on its shaft 71 which drives suitable belt means 72 operating over the driven pulley 73. The driven pulley 73 is fixed to a rapid traverse output shaft 74 upon which is also fixed the member 75 forming one member of the variable pitch pulley 75—76, the member 76 being movable axially on the shaft 74 in driving relation thereon relative to the fixed member 75. A suitable V-belt 77 operating over the variable pitch pulley 75—76 operates between the members 78 and 79 of the idler V-belt pulley 78—79, the member 79 being formed integral with another member 80, both of which members 79 and 80 move axially of the member 78 and a member 81 of a second variable pitch pulley. A second V-belt 82 operates between the members 80 and 81 of the variable pitch pulley 80—81 and between the members 83 and 84 of the variable pitch pulley 83—84 in which the member 84 is adjustable axially in driving relationship on the feed output shaft 85.

By axially adjusting the position of the members 76 and 84 on the shafts 74 and 85, variation in feed rate output may be effected in the shaft 85 in an infinitely variable manner. This adjustment may be accomplished by means of the shifting lever 86 carried on a suitable pivot 87 in the knee 17 of the milling machine and which lever has a roller 88 engaging between the members 76 and 84 so that as the outer end 86a of the bell crank arm 86 is actuated, the members 76 and 84 will be adjusted to vary the speed through the V-belts 77 and 82 from the motor 69 and the shaft 85. The lever arm 86a is actuated by a roller 89 carried in its outer end which engages the feed rate control cam 90 carried on a suitable shaft 91 to which is connected the worm wheel 92 which is driven by the worm 93. The worm 93 is formed on a shaft 94 having another worm wheel 95 which in turn is driven by a worm 96 carried on the shaft 97 of the feed rate regulating motor 98. Thus, by energizing the motor 98 in either direction, the rate of feed may be infinitely varied to any desired value.

Feed driving power from the shaft 85 is transmitted through a worm 99 to a worm wheel 100 which is fixed on a shaft 101 having a gear 102 which in turn drives a gear 103 on a shaft 104. A gear 105 on the shaft 104 drives a gear 106 which is journaled on the power input shaft 107 to the knee, saddle, and table mechanism. The rapid traverse drive power from the shaft 74 is transmitted through the spiral gear 108 to the spiral gear 109 also journaled on the shaft 107. A shiftable clutch spool member 110 engages a friction clutch 111 to connect rapid traverse drive power to the shaft 107 or engages a jaw clutch 112 to connect the feed drive power to the shaft 107. The clutch spool member 110 may be shifted for feed or rapid traverse drive power by an appropriate apparatus such as the lever 113 carried on a suitable pivot 114 which is moved by a nut 115 carried on an operating screw 116 formed on the motor shaft of the feed and rapid traverse control motor 117. The feed and rapid traverse power from the shaft 107 is transmitted to the knee, saddle, and table members as follows: The knee is operated in vertical movement by engaging the clutch spool 118 with the clutch member 119 formed on the gear 120 connected to be driven from the shaft 107. This clutch spool is mounted on splined driving connection with the shaft 121 which has a bevel gear 122 which engages a mating bevel gear 123 fixed to the elevating screw 124 operating in the nut 125 fixed to the milling machine column 11. The clutch spool 118 is shifted into or out of power engagement to drive the shaft 121 from the shaft 107 by a lever arm 126 carried on a suitable pivot 127 in the knee of the milling machine and which lever is actuated by a nut 128 carried on a screw 129 which is operated by the knee actuator control motor 130.

Power to the saddle for cross movement is derived from the gear 120 which drives a gear 131 which is connectable by a suitable clutch spool member 132 to the saddle cross feed screw 133 which operates in a nut 134 fixed to the saddle 19. An operating lever 135 is carried on a pivot 136 and actuated by a nut 137 on the screw 138 driven by the saddle actuator motor 139, the actuating screw 133 being appropriately journaled against axial movement in the knee 17.

The work table is driven from the gear 131 which drives the gear 140 connectable by the clutch spool 141 to drive the spline shaft 142 journaled against axial movement in the knee 17 by suitable bearing means.

A bevel pinion 143 operatively slidable in driving relationship on the shaft 142 is suitably journaled against axial movement in the saddle 19 of the milling machine in appropriate bearings. A mating bevel gear 144 in driving relationship with a shaft 145, which is suitably journaled in the saddle 19 and in driving relationship with a second bevel gear 146 which is in driving engagement with a bevel gear 146a journaled against axial movement in the saddle 19. The last mentioned bevel gear 146a has a spline driving connection with the table feed screw 147 journaled against axial movement in the work table 21. A suitable nut 148 is engaged by the threaded portion 147a of the table feed screw 147, the nut being attached to the saddle 19 of the milling machine so that rotation of the screw 147 effects longitudinal table movement on the saddle relative to the saddle 19. Clutch member 141 for engaging or disengaging the table feed and rapid traverse drive power is controlled by a lever 149 carried on suitable pivots 150 in the knee of the milling machine and is operated by a nut 151 operating over a screw 152 driven by the table actuator motor 153.

*Manual table control and interlock mechanism*

Figure 7:
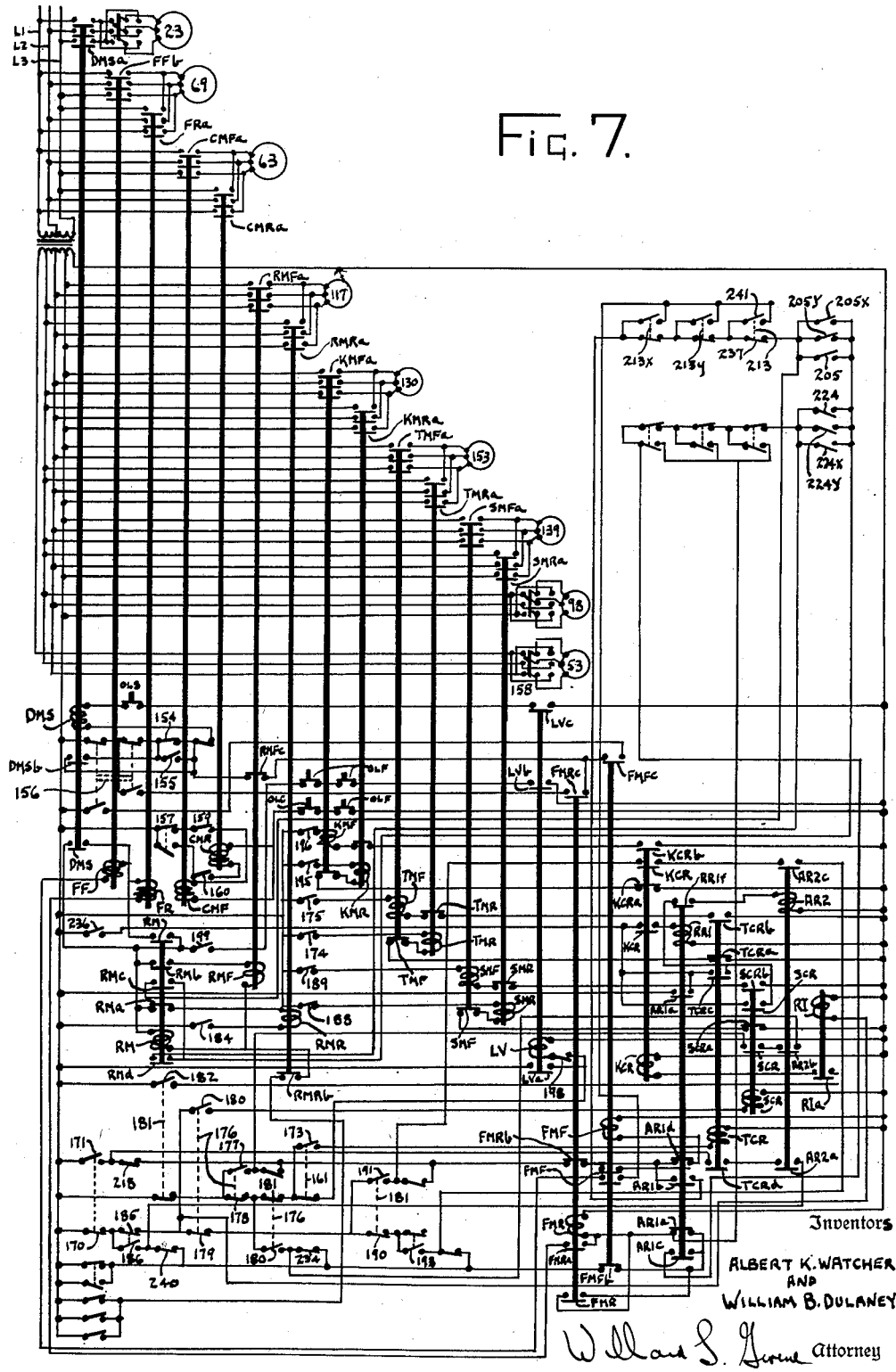
Figure 7 is an elementary wiring diagram of the control circuit for the milling machine.

Referring particularly to Figure 7 showing the elementary wiring diagram, the operation of the machine is as follows: The main drive spindle motor is started by closing either start button 154 appropriately located on the column or push button 155 located on the knee of the machine to energize relay DMS. A suitable manually operated reversing and off switch 156 is set for the desired direction of rotation of the cutter spindle. Energizing relay coil DMS closes contact DMSb to lock in the circuit after the switches 154 or 155 are released.

The desired spindle speed is selected by appropriately energizing the spindle clutch actuator motor 63 to adjust the back gear or high speed clutch member 42 as described by suitably operating the control switch 157. This is accomplished by actuating the control switch 157 to either energize relay CMF or CMR for one direction or the other of rotation of the spindle clutch actuator motor 63. The spindle belt adjusting motor 53 may be suitably actuated by controlling a reversing switch 158 so as to regulate the desired speed output through the belt drive. Suitable limit switches 159 and 160 are actuated by the movement of the nut 66 to limit the extent of travel of the nut 66 and the positioning of the clutch member 42 by breaking the respective circuits to the relay coils CMF or CMR, respectively.

Figure 3:
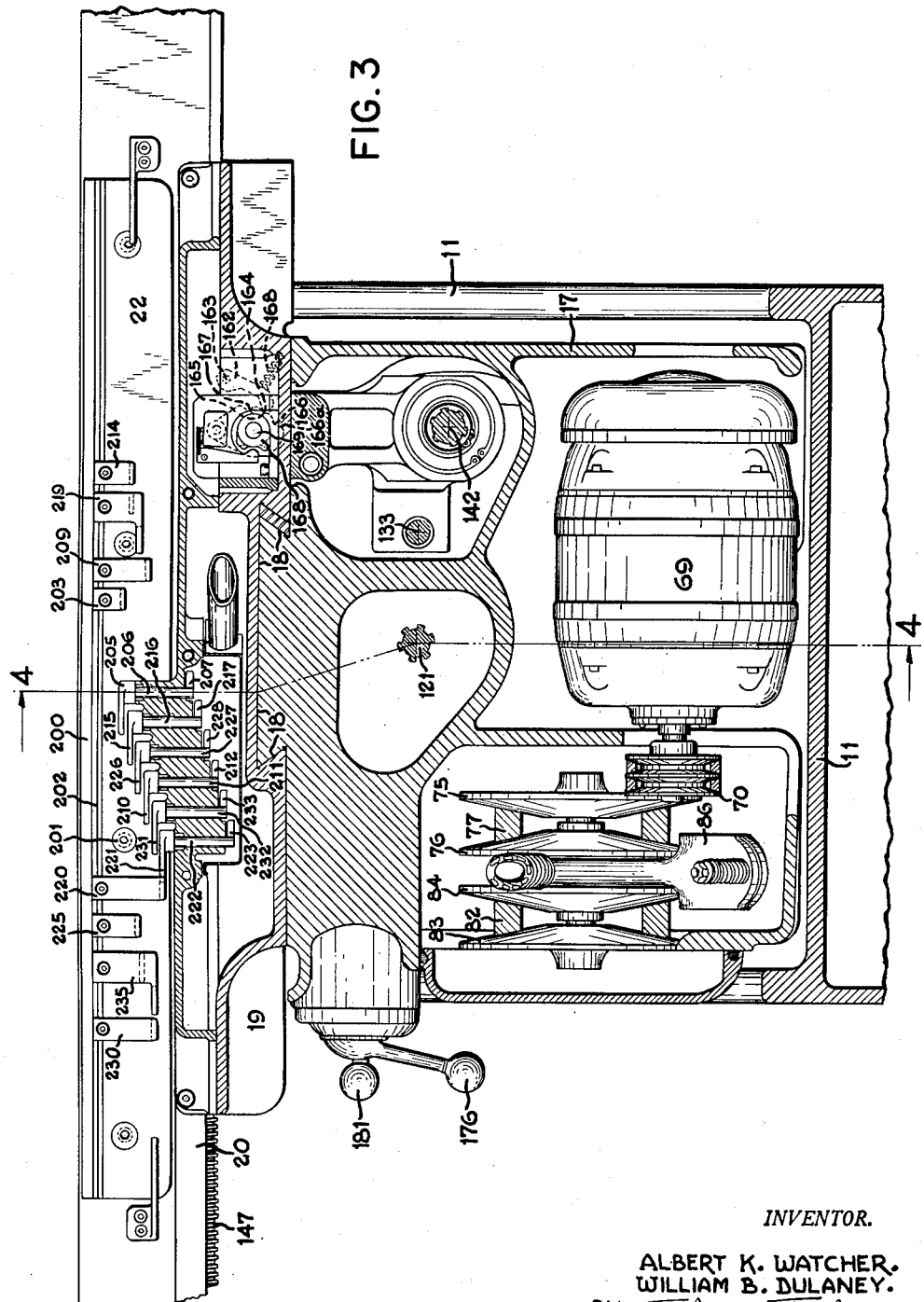
Figure 3 is a transverse section trough the knee, saddle, and table on the line 3—3 in Figures 1, 2, and 4.

Having the spindle speed thus properly selected and operating, the work table 22 may be caused to move to the left (facing the front of the machine) by moving the control lever 161 to the feed forward position 161a where the lever will be held by the spring detent 162, Figure 3, carried on a pivot pin 163 in the saddle 19 and having a pointed end 164 which operates in the neutral positioning notch 165 and in the forward feed notch 166 and the reverse feed notch 167 for the table 22, a suitable compression spring 168 being utilized to hold the point 164 in engagement with the notches 165, 166, and 167 on the cam 168 fixed to the rocker shaft 169 carrying the lever 161. With the table control lever 161 in the forward feed position 161a, the contact 170 is opened and contact 171 is closed, completing the circuit to the coil FMF which closes contact FMFa to complete a circuit to the coil FF which in turn closes contacts FFb to energize the feed drive motor 69 in a forward direction. Contact 172 is opened and contact 173 is closed, completing a circuit to the coil TCR which opens contact TCRa and closes contact TCRb, completing a circuit to the coil TMF which closes contacts TMFa, energizing the table clutch actuator motor 153 in forward direction which causes switch 174 to close. The table clutch 141 is engaged, applying driving power to the work table. Switch 175 is opened, breaking the circuit to the coil TMF which opens contacts TMFa, de-energizing the table clutch actuator motor 153 upon completion of engagement of the table clutch 141. An electrical interlock arrangement is provided between the table control lever 161 and the saddle control lever 176 so as to prevent movement of either table or saddle in the event the saddle control lever 176 is moved to a feed-in position while the table control lever is in a feed forward position. Under these conditions, should the saddle control lever 176 be moved to a feed-in position 176a, Figure 4, contact 177 is closed and contact 178 is opened, breaking the circuit to the coil TCR which restores contact TCRb to its normally opened condition and contact TCRa to its normally closed condition, completing a circuit to coil TMR since switch 174 has been previously closed, closing contacts TMRa, energizing the table clutch actuator motor 153 in reverse direction which causes contact 175 to close and table clutch 141 is disengaged to stop power actuation of the work table 22. Contact 174 is opened, breaking the circuit to the coil TMR which opens contacts TMRa, de-energizing the table clutch actuator motor 153 upon completion of disengagement of the table clutch 141. Contact 179 is opened and contact 180a is closed but the circuit is not complete to the coil SCR since contact 170 is open, thus the saddle clutch will not be engaged.

Interlock mechanism is also provided between the table control lever 161 and the saddle control lever 176 to prevent movement of either table or saddle if the saddle control lever is moved to feed-out position 176b. Under these conditions, contact 180a is closed and contact 181a' is opened, breaking circuit to the coil TCR which restores contact TCRb to its normally opened condition and closes contact TCRa, completing circuit to coil TMR since switch 174 has been previously closed, closing contacts TMRa, energizing the table clutch actuator motor 153 in the reverse direction. Contact 175 is closed and the table clutch 141 is disengaged to stop application of power drive to the work table. Switch 174 is opened, breaking circuit to the coil TMR which opens the contacts TMRa, de-energizing the table clutch actuator motor 153 upon completion of the disengagement of the clutch 141. Contact 179 is opened and contact 180a is closed but the circuit is not complete to the coil SCR since contact 170 is open.

An interlock mechanism is also provided between the table control lever 161 and the knee control lever 181 to prevent movement of either the table or knee if the knee control lever 181 is moved to feed-up or feed-down position while the table control lever is in feed forward position. Contact 182 is closed and contact 183 is opened, breaking circuit to coil TCR which restores contact TCRb to its normally opened condition and contact TCRa to its normally closed condition, completing the circuit to the coil TMR since contact 174 has been previously closed, closing contacts TMRa energizing table clutch actuator motor. This results in contact 175 being closed and the table clutch 141 disengaged. Contact 174 is opened, breaking circuit to the coil TMR which opens contacts TMRa, de-energizing the table clutch actuator motor upon completion of disengagement of the clutch 141. Contact 182 is closed but the circuit is not complete to the coil SCR since contact 170 is open, breaking the circuit to the coil RI, opening RIa.

When it is desired to cause the work table 22 to move to the left in rapid traverse movement, the control lever 161 is moved to the rapid traverse forward position 161b, Figure 3, causing the end 164 of the detent 162 to ride up on the surface 168a of the detent cam 168 which is so arranged that when the lever 161 is released it will automatically return from the rapid traverse position 161b to the feed forward position 161a. In addition to the results obtained by moving the control lever 161 to the feed forward position 161a, above described, contact 183 is also closed, completing a circuit to the coil RM, opening contact RMa, breaking circuit to the coil RMR and closing contact RMb, completing a circuit to the coil RMF to close contacts RMFa to thereby energize the rapid traverse clutch actuator motor 117 in the forward direction with the result that the contact 184 is closed. The rapid traverse clutch 110 is transferred from jaw side to friction side, thereby by-passing the variable speed belt transmission to connect driving power from the motor 69 directly to rapidly to actuate the table screw as described in connection with Figure 6. The interlocking mechanism described in connection with the actuation of the saddle control lever and the knee control lever when the table control lever is in forward feed position is equally effective when the table control lever is in rapid traverse forward position.

When the table control lever 161 is released to return to the feed forward position 161a, contact 183 is opened, breaking circuits to coils RMF and RM, opening contacts RMFa, de-energizing the rapid traverse clutch actuator motor 117 in the forward direction, and closing contact RMa, completing circuit to coil RMR since contact 184 is already closed, closing contacts RMRa, thereby energizing the rapid traverse motor in reverse direction. This causes the rapid traverse clutch 110 to be transferred from the friction side to the jaw engagement side to thereby reinstate the variable speed drive belt transmission back to actuating the work table. Contact 184 is opened upon completion of the engagement of the jaw clutch side of the rapid traverse clutch 110, thereby breaking circuit to the coil RMR, opening contacts RMRa de-energizing rapid traverse clutch actuator motor.

When it is desired to have the work table 22 moved to the right at feed rate, the control 161 is moved to the feed reverse position 161c, Figure 3. This will cause contact 185 to open and contact 186 to close, completing a circuit to the coil FMR which closes contact FMRa which completes a circuit to the coil FR to close contacts FRa which energizes the feed drive motor in reverse direction. Contact 172 is opened and contact 173 is closed, completing a circuit to the coil TCR which opens contact TCRa and closes contact TCRb, completing a circuit to the coil TMF which closes contacts TMFa, energizing the table clutch actuator motor 153 in forward direction. Contact 174 is closed, the table clutch 141 engaged, and the contact 175 opened breaking a circuit to the coil TMF which opens contacts TMFa de-energizing the table clutch actuator motor upon completion of engagement of the clutch 141.

Interlock mechanism is provided under these conditions of operation of the table control lever 161 and the saddle control lever 176 to prevent movement of either the table or the saddle if the saddle control lever is moved to feed-in position while the table control lever is in the feed-reverse position 161c. Contact 177 is closed and contact 178 is opened, braking circuit to the coil TCR which restores contact TCRb to open condition and contact TCRa to closed position, completing a circuit to the coil TMR since contact 174 has been previously closed so as to close contacts TMRa to energize the table clutch actuator motor 153 in the reverse direction. Contact 175 is closed and the table clutch 141 disengaged, disconnecting power to the table, while the contact 174 is opened, breaking a circuit to the coil TMR to open the contacts TMRa, de-energizing the table clutch motor upon completion of the disengagement of the table clutch 141. Contact 179 is opened and contact 180a is closed but the circuit is not complete to the coil SCR since contact 185 is open.

Interlock is also provided under conditions when the table control lever is in feed-reverse position 161c so that the saddle control lever 176, when operated to feed-out position, will stop operation of the table or saddle. Contact 180a is closed and contact 181a' is opened, breaking circuit to coil TCR which restores contact TCRb to its open condition and contact TCRa to closed condition, energizing coil TMR, since contact 174 has been previously closed, so as to close contacts TMRa to energize table actuator motor in reverse direction. This closes contact 175, disengaging the table clutch and ultimately opening contact 174 which opens circuit to coil TMR which in turn opens contacts TMRa to stop the table actuator motor upon completion of disengagement of the table clutch 141. Contact 179 is opened and contact 180a is closed but the circuit is not complete to the coil SCR since contact 185 is open.

Further interlock control mechanism is provided between the table control lever 161 and the knee control lever 181 to prevent movement of either the table or knee if the knee control lever is moved to feed-up or feed-down position while the table control lever is in reverse position 161c. Contact 182 is closed and contact 183 is opened, breaking the circuit to the coil TCR which retores contact TCRb to its open position and closes contact TCRa, energizing coil TMR and, through closed contact 174, closing contacts TMRa to reversely actuate the table clutch motor 153 which causes contact 175 to be closed and disconnect the table clutch 141 and finally opens contact 174 breaking circuit to coil TMR which opens contact TMRa stopping the clutch actuator motor after the clutch 141 has been disengaged. Contact 182 is closed but the circuit is not complete to coil KCR since contact 185 is open, breaking circuit to coil RI and opening contact RIa.

When it is desired to actuate the work table to the right in rapid traverse movement, table control lever 161 is positioned at 161d. In addition to all the results above set forth for the position of the control lever 161 in the reverse feed position 161c, contact 183 is also closed, completing a circuit to coil RM, opening contact RMa, breaking the circuit to coil RMR and closing contact RMb, energizing coil RMF and closing contacts RMFa, thereby energizing rapid traverse clutch actuator motor 117 in the forward direction causing contact 184 to close, and to engage the friction rapid traverse clutch 110 for rapid traverse actuation of the work table in the reverse direction. Interlocking mechanism, as described above, are equally effective whether the table is moving in feed or rapid traverse rates in the reverse direction. The release of the lever 161 will cause it to automatically return from the rapid traverse reverse position 161d to the feed reverse position 161c. Contact 183 is opened, breaking circuit to coils RMF and RM and opening contacts RMFa, de-energizing the rapid traverse clutch actuator motor in the forward direction and closing contact RMa to energize coil coil RMR and, since contact 184 is closed, the contacts RMRa are closed, thereby energizing the rapid traverse clutch actuator motor. The rapid traverse clutch is then transferred from friction side to feed jaw side, thereby reinstating the feed drive to the table screw. Contact 184 is opened upon completion of engagement of the feed jaw clutch, breaking circuit to coil RMR and opening contacts RMRa.

There is thus provided, in an electrically controlled milling machine mechanism, an arrangement wherein an electrical interlock mechanism is provided between the table transmission and the knee and saddle transmissions wherein the positioning of the table control lever in the feed and rapid traverse positions in either direction sets up electrical circuits so that in the event the operator would inadvertently move the saddle and/or the knee control levers power to the respective movable members of the machine is automatically cut off to prevent damage or harm to the work and cutters.

*Manual saddle control and interlock mechanism*

To cause the saddle to move at feed rate toward the column of the milling machine by positioning the saddle control lever 176 in the feed-in position 176a, a detent cam arrangement like that described for the table control lever 161, but not shown, controls the lever 176 so that it will be held automatically in the feed-in position 176a or feed-out position 176b but must be held manually in the respective rapid traverse in and out positions 176c and 176d. When the lever 176 is moved into position 176a, contact 178 is open and contact 177 is closed, completing a circuit to the coil FMF, closing contact FMFa which energizes coil FF to close contacts FFb to energize the feed drive motor in forward direction. Contact 179 is opened and contact 180a is closed, energizing coil SCR which opens contact SCRa and closes contact SCRb, energizing coil SMF which closes contacts SMFa, energizing saddle clutch actuator motor 139 in forward direction which causes contact 188 to close and the saddle clutch 132 to engage to apply feed drive power to the saddle screw. Contact 189 is opened, de-energizing coil SMF which opens contacts SMFa, de-energizing the saddle clutch actuator motor 139 upon completion of engagement of the saddle clutch 161.

Interlock mechanism is provided between the saddle control lever 176 and the table control lever 161 which prevents movement of either the saddle or table if the table control lever is moved to feed-forward position while the saddle control lever is in feed-in position. Contact 171 is closed and contact 170 is opened, de-energizing coil SCR which opens contact SCRb and closes contact SCRa to energize coil SMR, since contact 188 has been previously closed, to close contacts SMRa, energizing the saddle clutch actuator motor in reverse direction. Contact 189 is closed and the saddle clutch is disengaged, and the contact 188 is opened, de-energizing the coil SMR and opening contacts SMRa upon completion of disengagement of the saddle clutch by the saddle clutch actuator motor. Contact 172 is opened and contact 173 is closed but the circuit is not complete to energize coil TCR since contact 178 is open.

Interlock is also provided between the saddle control lever 176 and the table control lever 161 which prevents movement of either the saddle or table if the table control lever is moved to feed-reverse position while the saddle control lever is in feed-in position. Contact 186 is closed and contact 185 is opened, de-energizing coil SCR to open contact SCRb and to close contact SCRa to energize coil SMR, since contact 188 has been previously closed, to close contacts SMRa, energizing the saddle clutch actuator motor in reverse direction. Contact 189 is closed and the saddle clutch is disengaged and the contact 188 is opened, de-energizing coil SMR to open contacts SMRa, de-energizing the saddle clutch actuator motor upon disengagement of the saddle clutch 132. Contact 172 is opened and contact 173 is closed but circuit is not complete to coil TCR since contact 178 is open.

There is an interlock provided between the saddle control lever 176 and knee control lever 181 which prevents movement of either the saddle or knee if the knee control lever is moved to a feed-up position 181a while the saddle control lever is in a feed-in position. Contact 182 closes and contact 183 opens, de-energizing coil FMF and opening contact FMFa, de-energizing coil FF to open contacts FFb, de-energizing the feed drive motor 69. Contact 190 opens and contact 191 closes but contact 179 is open so that coil FMF remains de-energized.

Interlock is also provided between the saddle control lever 176 and the knee control lever 181 which prevents movement of either saddle or knee if the knee control lever is moved to feed-down position while the saddle control lever is in feed-in position. Contact 182 closes and contact 183 opens, de-energizing coil FMF, opening contacts FFb de-energizing feed drive motor. Contact 192 opens and contact 193 closes but contact 179 is open so that the coil FMR remains de-energized.

Figure 4:
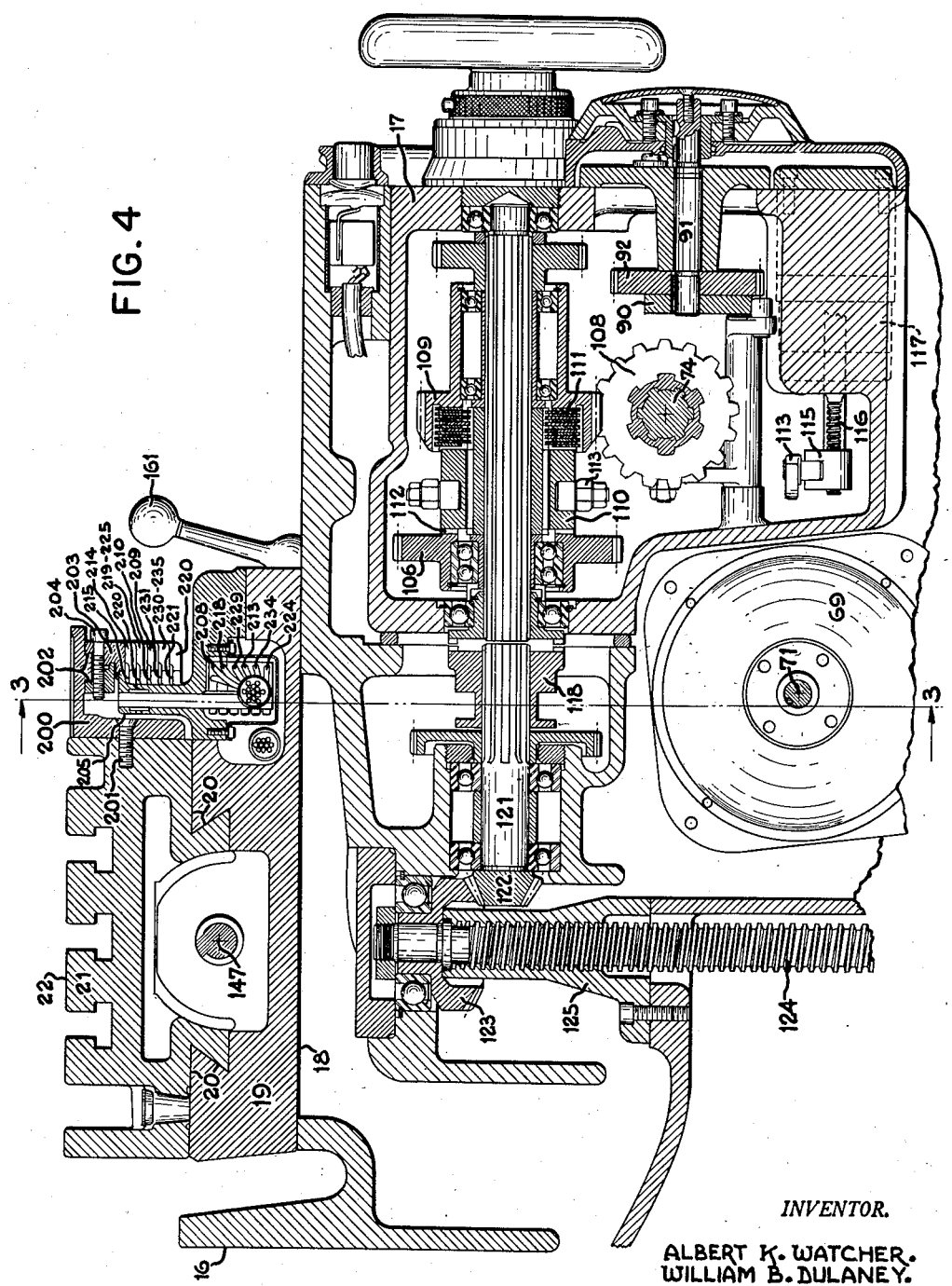
Figure 4 is a cross-section through the knee, saddle, and table mechanism indicated by the line 4—4 in Figures 1 and 3.

In order to cause the saddle to move toward the column at rapid traverse rate, the saddle lever 176 is moved in the rapid traverse in position 176c, Figure 4. In addition to all of the aforementioned results, the contact 194 is also closed, energizing coil RM and opening contact RMa, de-energizing coil RMR and closing contact RMb, completing the circuit to the coil RMF to close contacts RMFa, thereby energizing the rapid traverse clutch actuator motor 117 in the forward direction. Contact 184 is closed and the rapid traverse clutch 110 is transferred from feed jaw side to friction rapid traverse side for rapid operation of the saddle screw 133.

Interlocks are equally effective whether the saddle is moving at feed or rapid traverse rates to control the simultaneous stopping of the saddle and table as aforementioned. Release of the lever 176 from rapid traverse in position 176c causes it to automatically return to the feed-in position 176a. Contact 194 opens, de-energizing coils RMF and RM, opening contacts RMFa, de-energizing the rapid traverse clutch actuator motor in the forward direction and closing contact RMa to energize coil RMR, since contact 184 is already closed, thus closing contacts RMRa to energize the rapid traverse clutch actuator motor in reverse direction to move the rapid traverse clutch from friction to positive jaw feed side. Contact 184 is opened upon completion of engagement of the jaw clutch side of the rapid traverse clutch, thereby de-energizing coil RMR and opening contacts RMRa.

When it is desired to cause the saddle to feed outwardly from the column, the saddle control lever 176 is moved to the feed out position 176b, Figure 4, to open contact 181a' and close contact 180a, energizing coil FMR to close contact FMRa, to energize coil FR, closing contacts FRa to energize the feed drive motor in reverse direction. Contact 179 is opened and contact 180a is closed, energizing coil SCR which opens contact SCRa and closes contact SCRb, energizing coil SMF, closing contacts SMFa to energize saddle clutch actuator motor 139 in forward direction, closing contact 188, engaging the saddle clutch to apply driving power to the saddle feed screw 133, and opening contact 189, de-energizing coil SMF to open contacts SMFa, again de-energizing the saddle clutch actuator motor upon completion of engagement of the saddle clutch.

Interlock mechanism is provided between the saddle control lever 176 and the table control lever 161 to prevent movement of either saddle or table if the table control lever is moved to feed-forward position while the saddle control lever is in feed-out position. Contact 171 is closed and contact 170 is opened, de-energizing coil SCR to open contact SCRb and close contact SCRa, energizing coil SMR, since contact 188 has been previously closed, closing contacts SMRa, energizing the saddle clutch actuator motor 139 in reverse direction which results in the closing of contact 189, disengagement of the saddle clutch 132, and the opening of contact 188 to de-energize coil SMR and open contacts SMRa de-energizing saddle clutch actuator motor on disengagement of the saddle clutch. Contact 172 is opened and contact 173 is closed but coil TCR is not energized since contact 181a' is open.

Interlock is provided between the saddle control lever 176 and the control lever 161 which prevents movement of either saddle or table if the table control lever is moved to feed reverse position while the saddle control lever is in feed-out position. Contact 186 is closed and contact 185 is opened, de-energizing coil SCR which opens contact SCRb and closes contact SCRa to energize coil SMR, since contact 188 has been previously closed, to close contacts SMRa, energizing the saddle clutch actuator motor in reverse direction, which results in the closing of contact 189, disengagement of the saddle clutch, and the ultimate opening of the contact 188 to de-energize the coil SMR which opens contacts SMRa, de-energizing the saddle clutch actuator motor upon completion of the disengagement of the saddle clutch. Contact 172 is opened and contact 173 is closed but circuit is not complete to energize coil TCR since the contact 181a' is open.

Interlock is also provided between the saddle control lever 176 and the knee control lever 181 which prevents movement of either saddle or knee if the knee control lever is moved to feed-up position when the saddle control lever is in feed-out position. Contact 182 closes and contact 183 opens, de-energizing coil FMR and opening contact FMRa, de-energizing coil FR to open contacts FRa, de-energizing the feed drive motor. Contact 199 opens and contact 191 closes but contact 179 is open so that coil FMF is not energized.

An interlock is provided between the saddle control lever 176 and the knee control lever 181 which prevents movement of either saddle or knee if the knee control lever is moved to feed-down position while the saddle control lever is in feed-out position. Contact 182 closes and contact 183 opens, de-energizing coil FMR, opening contact FMRa, de-energizing coil FR which opens contacts FRa, de-energizing the feed drive motor. Contact 192 opens and contact 193 closes but contact 179 is open so that the coil FMR is not energized.

In order to effect rapid traverse outward movement of the saddle, the saddle control 176 is moved to the rapid traverse position 176d where it must be held manually so long as rapid traverse movement is desired. In addition to all of the results as set forth above when the control lever is in the feed-out position 176b, contact 194 is also closed, energizing coil RM, opening contact RMa to de-energize coil RMR, closing contact RMb to energize coil RMF, closing contacts RMFa to energize the rapid traverse clutch actuator motor in a forward direction. Contact 184 is closed and rapid traverse clutch 110 is transferred from jaw side to friction rapid traverse side to effect rapid traverse driving power to the saddle screw 133.

The interlocks are effective the same as when the control 176 is in the feed-out position 176b so that these interlocks are equally effective whether the saddle is moving in feed or rapid traverse rates.

Upon release of the lever 176 it automatically returns to the feed position 176b so that contact 194 is opened, de-energizing coils RMF and RM to open contacts RMFa, de-energizing the rapid traverse clutch actuator motor 117 in the forward direction and closing contact RMa to energize coil RMR, since contact 184 is already closed, to close contacts RMRa to energize the rapid traverse clutch actuator motor 117 in reverse direction. This transfers the rapid traverse clutch 110 from friction side to feed jaw side, contact 184 being opened upon completion of engagement of the jaw clutch side to de-energize the coil RMR opening contacts RMRa and de-energize the rapid traverse clutch actuator motor.

*Manual knee control and interlock mechanism*

When it is desired to cause the knee to move upwardly on the column at feed rate, the knee control lever 181 is moved up to the feed-up position 181a. This knee control lever is provided with the same type of control and detent cam similar to the cam 168 for the lever 161 so that it will automatically stay in the up or down feed positions 181a and 181b but must be held in the respective rapid traverse positions 181c and 181d. When the control lever 181 is in the up-feed position 181a, contact 190 is opened and contact 191 is closed, energizing coil FMF which closes contact FMFa to energize coil FF, closing contacts FFb which energizes the feed drive motor in upward direction. Contact 183 is opened and contact 182 is closed, energizing coil KCR which opens contact KCRa and closes contact KCRb to energize coil KMF to close contacts KMFa to energize the knee clutch actuator motor 130 in upward direction. Contact 195 is closed, the knee clutch 118 is engaged, and contact 196 is opened, de-energizing coil KMF to open contacts KMFa, de-energizing the knee clutch actuator motor upon completion of engagement of the knee clutch.

Interlock is provided between the knee control lever 181 and table control lever 161 which prevents movement of either the knee or table if the table control lever is moved to feed-forward position while the knee control lever is in feed-up position. Contact 171 is closed and contact 170 is opened, de-energizing coil RI to open contact RIa, de-energizing coil KCR which opens contact KCRb and closes contact KCRa, energizing coil KMR, since contact 195 has been previously closed, to close contacts KMRa, energizing the knee clutch actuator motor in reverse direction which results in the closing of contact 196, the knee clutch 118 disengaged, contact 195 is opened to de-energize coil KMR which opens contacts KMRa, de-energizing the knee clutch actuator motor 130 upon completion of disengagement of the knee clutch 118. Contact 172 is opened and contact 173 is closed but the coil TCR is not energized since contact 183 is open.

Interlock mechanism is provided between the knee control lever 181 and the table control lever 161 which prevents movement of either knee or table if the table control lever is moved to feed-reverse position while the knee control lever is in feed-up position. Contact 186 is closed and contact 185 is opened, de-energizing coil RI which opens contact RIa, de-energizing coil KCR which opens contact KCRb and closes contact KCRa, energizing coil KMR and, through closed contact 195, closes contacts KMRa energizing knee clutch actuator in reverse direction. Contact 196 is closed, the knee clutch is disengaged, and contact 195 opened to de-energize coil KMR to open contacts KMRa to de-energize the knee clutch actuator motor upon completion of disengagement of the knee clutch. Contact 172 is opened and contact 173 is closed but the circuit is not completed to energize coil TCR since the contact 183 is open.

Interlock mechanism is provided between the knee control lever 181 and the saddle control lever 176 which prevents movement of either knee or saddle if the saddle control lever is moved to either feed-in or feed-out position while knee control lever is in feed-up position. Contact 180a is closed and contact 179 is opened, de-energizing coil FMF to open contact FMFa, breaking circuit to coil FF to open contacts FFb, de-energizing the feed motor. Since contact 183 is open, closure of contact 177 cannot complete circuit to the coil FMF and closure of contact 180a cannot energize coil FMR.

To cause upward movement of the knee at rapid traverse rate, the knee control lever 181 is moved up to rapid traverse upward position 181c. In addition to all the results as aforementioned with the control lever in the position 181a, contact 197 is also closed, completing the circuit to energize coil RM, opening contact RMa to de-energize coil RMR and close contact RMb to energize coil RMF to close contacts RMFa which energizes rapid traverse clutch actuator motor in the forward direction. Contact 184 is closed and rapid traverse clutch 119 is shifted to the friction rapid traverse side to thus effect the rapid upward movement the knee.

Interlocks are equally effective in the position 181c as in the position 181a for both upward feed and rapid traverse movements of the knee.

Release of the control lever 181, when in the position 181c, causes it to return to position 181a so that contact 197 is opened, de-energizing coils RMF and RM to thus open contacts RMFa, de-energizing the rapid traverse clutch actuator motor 117 in the upward direction and closing contact RMa, energizing coil RMR, since contact 184 is already closed, closing contacts RMRa to thereby energize the rapid traverse clutch actuator motor in reverse direction to shift the rapid traverse clutch to feed jaw side and open contact 184 upon completion of the engagement of the jaw clutch side to thereby de-energize the coil RMR and open contacts RMRa, de-energizing the rapid traverse clutch actuator motor.

To cause downward feeding movement of the knee, the knee control lever 181 is moved to the feed down position 181b. Contact 192 is opened and contact 193 is closed to energize coil FMR to close contact FMRa to energize coil FR which closes contacts FRa which energizes the feed drive motor in the reverse direction. Contact 183 is opened and contact 182 is closed to energize coil KCR which opens contact KCRa and closes contact KCRb to energize coil KMF which closes contacts KMFa, energizing the knee actuator motor in upward direction, resulting in opening of contact 195 and the engagement of the knee clutch 132 and the opening of the contact 196 to de-energize the coil KMF and open the contacts KMFa de-energizing the knee clutch actuator motor upon completion of engagement of the knee clutch.

Interlock mechanism is provided between the knee control lever 181 and the table control lever 161 to prevent movement of either the knee or table if the table control lever is moved to feed-in position while the knee control lever is in feed-down position. Contact 171 is closed and contact 170 is opened, de-energizing coil RI to open contact RIa to de-energize coil KCR which opens contact KCRb and closes contact KCRa to energize coil KMR, since contact 195 has been previously closed, closing contacts KMRa to energize the knee clutch actuator motor in reverse direction which results in contact 196 being closed, the knee clutch being disengaged, and the contact 195 opened to de-energize coil KMR which opens contacts KMRa, de-energizing the knee clutch actuator motor upon completion of disengagement of the knee clutch. Contact 172 is opened and contact 173 is closed but the coil TCR is not energized since contact 183 is open.

Interlock mechanism is provided between the knee control lever 181 and the table control lever 161 which prevents movement of either the knee or table if the table control lever is moved to feed-reverse position while the knee control lever is in feed-down position. Contact 186 is closed and contact 185 is opened, de-energizing coil RI so as to open contact RIa to de-energize the coil KCR which opens contact KCRb and closes contact KCRa to energize coil KMR, since contact 195 has been previously closed, closing contacts KMRa, energizing knee clutch actuator motor in the reverse direction causing contact 196 to close, the knee clutch to be disengaged, and contact 195 to be opened, breaking circuit to the coil KMR to open contacts KMRa de-energizing the knee clutch actuator motor upon completion of disengagement of the knee clutch. Contact 172 is opened and contact 173 is closed but coil TCR is not energized since contact 183 is open.

Interlock mechanism is provided between the knee control lever 181 and the saddle control lever 161 which prevents movement of either knee or saddle if the saddle control lever is moved to either feed-in or feed-out position while the knee control lever is in a feed-down position. Contact 180a is closed and contact 179 is opened, de-energizing coil FMR to open contact FMRa to de-energize coil FR, opening contacts FRa, de-energizing the feed motor. Since contact 183 is open, closing of contact 177 will not energize coil FMF and closure of contact 180a will not energize coil FMR.

To effect downward rapid traverse of the knee, the control lever 181 is moved to position 181d. In addition to all of the results as above set forth with the control lever in position 181b, contact 197 is also closed, energizing coil RM which opens contact RMa, de-energizing coil RMR and closing contact RMb to energize coil RMF to close contacts RMFa to energize the rapid traverse clutch actuator motor in the forward direction, resulting in contact 184 being closed and the rapid traverse clutch being transferred from jaw side to friction side for rapid traverse driving of the knee elevating screw for rapid downward traverse of the knee.

Interlocks are equally effective when the saddle is moving in feed or at rapid traverse rates in downward movement.

Release of the control lever 181, when in position 181d, allows it to return to the feed-down position 181b so that contact 197 is opened, de-energizing coils RMF and RM and opening contacts RMFa, de-energizing the rapid traverse actuator motor in upward direction and closing contact RMa to energize coil RMR, since contact 184 is already closed, closing contacts RMRa to thereby energize the rapid traverse clutch actuator motor in reverse direction which results in the rapid traverse clutch being transferred from friction side to positive jaw feed side. Contact 184 is opened upon completion of engagement of the jaw clutch side of the rapid traverse clutch, thereby de-energizing coil RMR, opening contacts RMRa, and de-energizing the rapid traverse clutch actuator motor.

There has thus been provided, in a milling machine having a knee, saddle, and table, whose movements are controlled by electrically operated mechanism, an electrical interlock arrangement whereby no harm can come to the machine elements in the event an operator inadvertently operates more than one of the control levers for the respective table, saddle, and knee members. In this arrangement, whenever the work table control lever is so positioned for forward or reverse feed or rapid traverse and the operator should also actuate the saddle control lever for in and out movements or the knee control lever for up and down movements, the table is automatically stopped, together with the respective saddle and knee which it was attempted to also operate with the operation of the table. Similarly, when a certain series of saddle movements have been established and the knee or table control lever should be operated, again the respective members are all stopped automatically. Also, when the knee is set in predetermined movements up and down, operation of either the table or saddle control levers also stops operation of all machine elements.

Emergency stop control mechanism

In order to provide means for at any time bringing the machine to a stop in case of an emergency, there is provided an emergency stop button contact 198 so connected that, upon depression of the stop button, all motions, in either direction, of the table, saddle, knee, and spindle rotation cease and will not be resumed upon release of the emergency stop button 198 until all control levers have first been returned to their neutral positions. When the stop button 198 is depressed, opening its contact, the coil LV is de-energized which opens contacts LVa and LVb which de-energizes coils FF and FR which opens contacts FRa and FFb, if previously closed, to de-energize the feed drive motor 69 and contact LVc to de-energize coil DMS which in turn opens contacts DMSa, de-energizing the spindle drive motor 23. Upon release of the stop button 198 to close its contact, coil LV is not energized because contact LVa is open so that contact 183 is open if the knee control lever is in any position other than neutral; contact 178 is open if the saddle control lever is in feed-in or rapid traverse in position; contact 181a' is open if the saddle control lever is in feed-out or rapid traverse out position; and contact 172 is open if the table control lever is in any position other than neutral.

In order to cause the table, saddle, knee, and spindle to resume motion in any selected direction, all of the control levers are returned to neutral and the spindle start button 154 again depressed. Contacts 183, 178, 181a', and 172 are closed, completing circuit to energize coil LV which closes contact LVa, completing a second circuit to the coil LV; contact LVb closes and contact LVc closes.

Should a discontinuance of power supply to the machine take place or an exceptionally reduced voltage be present from the power supply, the same result will take place as in depressing the emergency stop button 198 to thereby de-energize the coil LV and repeat the operating conditions above recited.

An appropriate overload mechanism may be provided for cases where excess mechanical demand is imposed on the machine which might damage the feed drive mechanism which includes a torque release contact 199 being mechanically opened to de-energize the coils FF and FR, opening contacts FFb and FRa to de-energize the feed drive motor. The torque limit contact 199 may be actuated by any suitable mechanism in conjunction with the load imposed on the feed mechanism such as that shown in application Serial No. 720,111, filed January 3, 1947, and now Patent No. 2,484,616, granted Oct. 11, 1949, but any other form of arrangement for releasing said contact in relation to the load on the feed drive may be utilized. Since the detail mechanism for operating the torque limit contact 199 forms no part of this invention, further specific description of the same is not believed required.

Automatic operating and control mechanism

The knee, saddle, and table members and the spindle rotation may be automatically controlled by the electrical apparatus associated with the above mentioned manually electrical controlled apparatus.

To control the automatic movement of the work table to complete a sequence of predetermined motions in a cutting and operating cycle, there is provided a series of dogs carried on the work table which actuate a series of electrical control switches or contacts as the table moves back and forth in the operating cycle. This arrangement is best shown in Figures 3 and 4. On the front of the work table 22 is rigidly mounted a bracket 200 by suitable screws 201 which has formed on it a dog-carrying dovetail 202. A dog 203 is clamped to the dovetail by a suitable screw 204 at such a place that a lever 205 is actuated by the dog so as to move its outer end inwardly, rocking the shaft 206 journaled in the saddle of the milling machine and having a lever member 207 on its lower end engaging an appropriate micro-switch contact 208 whenever the table has reached a point in its movement where it is desired to have the table alter its speed from a feed rate to a rapid traverse rate in the left-hand direction, Figure 3.

A dog 209 is mounted on the dovetail 202 at such a place that the lever 210 on the rock shaft 211 has an arm 212 which actuates micro-limit switch contact 213 whenever the table has reached a point in its movement where it is desired to have the table alter tis speed from a rapid traverse rate to a feed rate while moving in the left-hand direction.

A dog 214 carried on the dovetail 202 is positioned so that it will engage and operate the lever 215 on the rock shaft 216 having a lever 217 engaging a micro-limit switch contact 218 whenever the table has reached a point in its movement where it is desired to have the table cease motion to the left, except where it is desired to have the table immediately resume motion to the right.

Attached to the dovetail 202 is the trip dog 219 at such a place that it actuates the lever 215 so as to operate the micro-switch 218 whenever the table has reached a point where it is desired to have the table reverse its direction of motion from left to right.

A trip dog 220 is carried on the dovetail 202 at such a place that it engages a lever 221 on the rock shaft 222 having a lever 223 engaging the micro-switch 224 whenever the table has reached a point in its movement where it is desired to have the table alter its speed from a feed rate to the rapid traverse rate in the right-hand direction.

A dog 225 carried on the dovetail 202 engages the lever 226 on the rock shaft 227 having the lever arm 228 engaging the micro-switch 229 whenever the table has reached a point in its movement where it is desired to have the table alter its speed from the rapid traverse rate to the feed rate in the right-hand direction.

A trip 230 is carried on the dovetail 202 at such a place that the lever 231 is actuated so as to rock its shaft 232 and the lever arm 233 to actuate the limit switch 234 whenever the table has reached the point in its movement where it is desired to have the table cease motion to the right, except where it is desired to have the table immediately resume motion to the left.

A dog 235 is mounted on the dovetail 202 at such a place that the lever 231 is actuated by it whenever the table has reached a point in its movement where it is desired to have the table reverse its direction of motion from right to left.

To start the automatic feed cycle of the work table after having set the control dogs on the dovetail 202 as above described, the table control lever is moved to feed position in the same direction as it is desired to have the table begin its motion. The various electrical devices above described will be set in accordance with these movements of the table control lever 161 as described. The cycle start button 236 is then momentarily depressed which completes a circuit through contact TCRc which is closed by the previous energizing of coil TCR to cause coil AR-1 to be energized, closing contact AR-1a, which completes a second circuit to the coil AR-1, and closing contacts AR-1b and AR-1c and opening contacts AR-1d and AR-1e and contact AR-1f to energize coil AR-2 which closes contacts AR-2a, AR-2b, and AR-2c.

When the table, moving to the left at feed rate, reaches a point that the dog 203 operates the associated lever 205, the table will alter its speed from the feed rate to the rapid traverse rate. Contact 205 closes, completing circuit to coil RM, closing contact RMa and closing contact RMc to energize coil RM, closing contact RMb to energize coil RMF, closing contacts RMFa, thereby energizing the rapid traverse clutch actuator motor in the forward direction with the result that contact 184 is closed and the rapid traverse clutch 110 is transfered from feed jaw side to friction rapid traverse side.

When the table is moving to the left at rapid traverse rate and reaches a point where the dog 209 operates lever 210, the table will alter its speed from the rapid traverse rate to the feed rate. Contact 237 is opened, de-energizing coil RM which opens contacts RMc to de-energize coil RMF, closing contact RMa to energize coil RMR, since contact 184 is closed, closing contacts RMRa to energize the rapid traverse clutch actuator motor in reverse direction to return the rapid traverse clutch from rapid traverse friction side to positive jaw feed side and to open contact 184 upon completion of this shift of the clutch to thereby de-energize coil RMR to again open contacts RMRa de-energizing rapid traverse clutch actuator motor.

When the table is moving to the left at either feed or rapid traverse rate and reaches such a point that the dog 214 operates the lever 215, the table will stop and will not resume automatic operation until the table control lever is returned to neutral, the table control lever moved to the feed position in the direction it is desired to have the table again move, and the cycle start button again momentarily depressed. Contact 218 is opened, de-energizing coil FMF, opening contact FMFa to de-energize coil FF, opening contacts FFb to de-energize the feed motor in forward direction. Also, the rapid traverse clutch, if engaged on the friction side, is transferred to feed jaw side as when contact 237 is opened by dog 209 engaging lever 210.

When the table, moving to the left at either feed or rapid traverse rates, reaches such a point that the dog 219 operates the lever 215, the table will cease motion to the left and will move to the right at feed rate. Contact 238 is closed; contact 218 is opened, de-energizing coil FF which opens contacts FFb, de-energizing the feed motor in forward direction and de-energizing coil FMF which closes contact FMFb which, since contact TCRd is closed by previous energizing of coil TCR, completes the circuit to coil FMR which closes contact FMRa, completing circuit to coil FR to close contacts FRA, energizing the feed drive motor in reverse direction.

When the table is moving to the right at feed rate and reaches a point such that the the dog 220 operates the lever 221, the table will alter its speed from the feed rate to the rapid traverse rate. Contact 224 is closed, energizing coil RM, opening contact RMa and closing contacts RMd and RMb which maintain energization to coil RM and energize coil RMF, closing contacts RMFa, thereby energizing the rapid traverse clutch actuator motor in forward direction which results in closing of contact 184 and causing the rapid traverse clutch to be transferred from the jaw side to friction side for rapid traverse movement to the table screw.

When the table, moving to the right at rapid traverse rate, reaches a point that the dog 225 operates the lever 226, the table will alter its speed from the rapid traverse rate to feed rate. Contact 239 is opened, de-energizing coil RM and opening contacts RMd and RMb, de-energizing coil RMF and closing contact RMa to energize coil RMR, since contact 184 is closed, closing contacts RMRa, energizing the rapid traverse clutch actuator motor in reverse direction with the result that the rapid traverse clutch is transferred from friction side to positive jaw feed side and contact 184 is opened upon completion of engagement of the jaw clutch of the rapid traverse clutch thereby de-energizing the coil RMR, opening the contacts RMRa and de-energizing the rapid traverse clutch actuator motor.

When the table is moving to the right at either feed or rapid traverse rates and reaches a point that the dog 230 operates the lever 231, the table will stop and will not resume automatic motion until the table control lever is returned to neutral. Contact 240 is opened, de-energizing coil FMR, opening contact FMRa to de-energize coil FR, opening contacts FRa, de-energizing the feed motor in reverse direction. Also, the rapid traverse clutch, if engaged on the friction side, is transferred to jaw side as when contact 224 is opened as described.

When the table, moving to the right at either feed or rapid traverse rates, reaches such a point that the dog 235 operates lever 231, the table ceases motion to the right and will move to the left at feed rate. Contact 241 is closed and contact 240 is opened, de-energizing coil FR and opening contacts FRa, de-energizing the feed motor in reverse direction and breaking the circuit to coil FMR which closes contact FMRb which completes, through the closed contact TCRd, the circuit to the coil FMF which closes contact FMFa to energize coil FF and close contact FFb, energizing the feed drive motor in forward direction.

Figure 2:
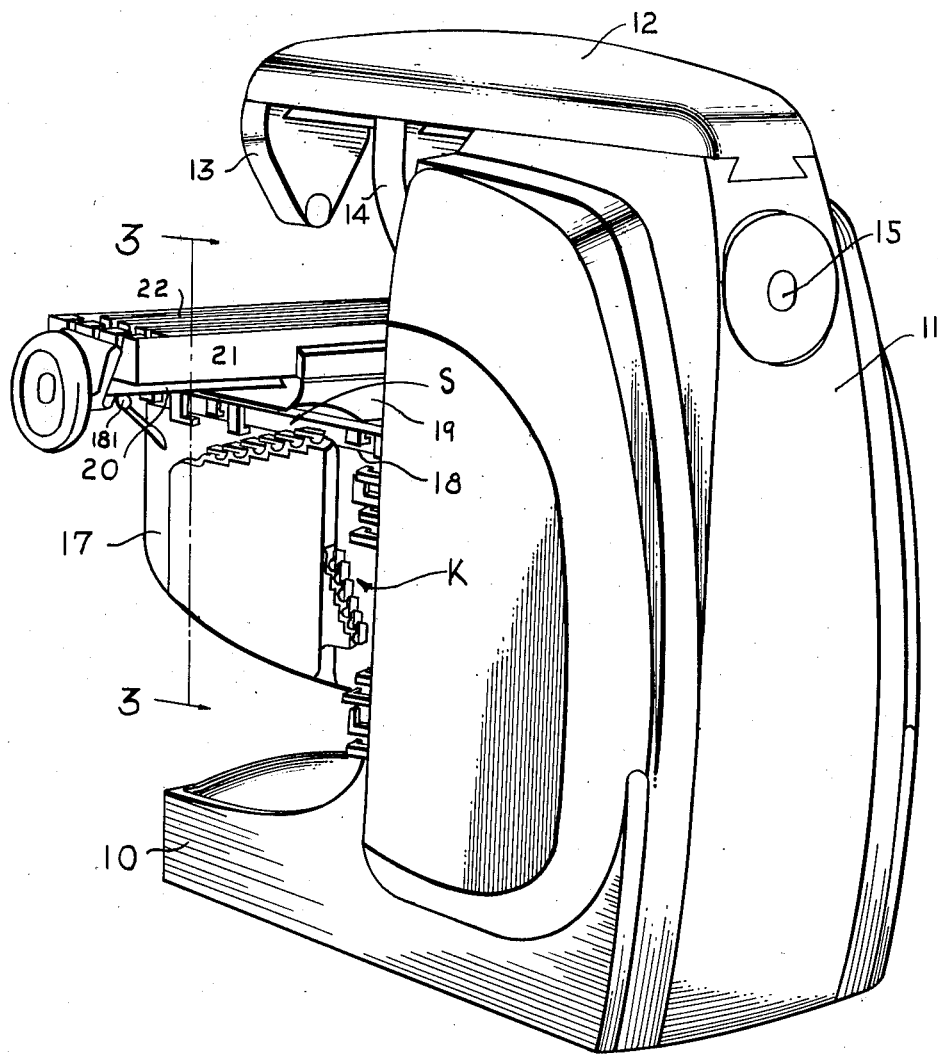
Figure 2 is a rear right-hand side perspective view of the milling machine of Figure 1.

In a similar fashion, trip arrangements are provided, as shown in Figure 2, at S for automatically controlling the saddle in and out movement at feed or rapid traverse in either direction and at K for the vertical movements of the knee, this arrangement being substantially the same as that shown in Figures 3 and 4 above described. The electric circuit is slightly modified to accommodate the saddle control and the knee control in the same electrical control circuit shown in Figure 7 by providing switches 213x and 229x which function the same as the switches 213 and 229 for the table, as described. Also, switches 205x and 224x are provided to function in connection with saddle movements the same as the switches 205 and 224, respectively, do for the table movement, as described. In a similar fashion, switches 213y and 229y are provided for knee movements and function the same as the switches 213 and 229 for the table and also switches 205y and 224y are provided and function the same for knee movements as the switches 205 and 224 do for table movements as described. Thus, all three members, the knee, saddle, and table, may be operated in automatic feed, rapid traverse, and reversing cycles for any character of work to be done.

The operation of the spindle drive motor 23 is controlled in coordination with the automatic feed cycle above described so that the cutter spindle is stopped and started at desired times in the cycle. One arrangement is to have the cutter spindle running only when the table is being fed to the left, the saddle is being fed in, or the knee is being fed up. These motions to the table, saddle, and knee are effected by manipulating their associated control levers 161, 176, and 181, respectively, to control the electric circuit as described. When any of these control levers are moved to a feed position in the direction it is desired to actuate the respective knee, saddle, and table above, the coil FMF is energized so as to close contact FMFc which, if switch 156 has been previously manipulated so as to maintain contact 156a open and contact 156b closed, in turn energizes coil DMS which closes contacts DMSa energizing the spindle motor.

When such table movements to the left, saddle movements in, or knee movements up are changed from feed rate to rapid traverse rate by the trip dog mechanism described, the coil RMF, which is energized, also opens contact RMFc to de-energize coil DMS which opens contacts DMSa, de-energizing the spindle drive motor.

When the knee, saddle, or table are moving to the left in or up, respectively, at rapid traverse rate and are changed to feed rate by the above described trip dog mechanism, the coil RMF, which is energized, also closes contact RMFc to again energize coil DMS which closes contacts DMSa and energizes the spindle motor. In instances where the knee, saddle, and table moving as above described is stopped or reversed, coil FMF, which is energized, opens contact FMFc to de-energize coil DMS which opens contacts DMSa to de-energize the spindle drive motor to bring the cutter spindle to rest.

The spindle motor is also controlled in a similar fashion when the work table is being moved to the right, the saddle out, and the knee down by appropriately operating their respective control levers. When these respective members are placed in feed motions in these directions, the coil FMR is energized to close contact FMRc which, if switch 156 has been previously manipulated in such a way as to maintain contact 156a closed and contact 156b open and contact 156c open and contact 156d closed, will energize coil DMS which closes contacts DMSa to energize the spindle drive motor. When these motions of the respective machine members change from feed to rapid traverse by the automatic trip dog mechanism, the coil RMF is energized to open contact RMFc to de-energize coil DMS to open contacts DMSa, de-energizing the spindle drive motor. When these respective machine members change from a rapid traverse back to a feed motion, the coil RMF—being de-energized—closes contact RMFc to energize coil DMS, closing contacts DMSa to energize the spindle motor.

When the various machine members are brought to a stop or are reversed, the coil FMF also opens contact FMRc, de-energizing coil DMS to open contacts DMSa, to de-energize the spindle drive motor.

There has thus been provided a control arrangement whereby the spindle drive motor and cutter spindle are stopped and started in direct relationship to the automatic cycle of applying feed or rapid traverse motion to the respective machine members or in reversing the motion to the machine member. Thus, in this arrangement, whenever the knee, saddle, and table are feeding to the left, the saddle in, or the knee up, the spindle is running, but when these members are moving in these directions at rapid traverse or reversed from these directions, the spindle drive motor is stopped. The same is also effective in instances where the table is feeding to the right, the saddle out, and the knee down. All of the above motions are initiated by the manual control levers and electric circuit mechanism which also includes the electrical interlock mechanism which is effective at all times, as described, during the respective motions of the knee, saddle, and table.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a milling machine feed and rapid traverse transmission and control mechanism having a drive motor, a rapid traverse power take-off from said motor, a feed take-off drive from said motor including an infinitely variable speed V-belt drive transmission, a common feed and rapid traverse output drive shaft, clutch means associated with said shaft for applying a rapid traverse drive or a feed drive from said variable speed transmission to said shaft, and individual power transmissions connectable to said drive shaft for actuating the knee, saddle, and table members of said milling machine, an electric rapid traverse and feed clutch actuator motor connected to operate said clutch, and electric control switch means actuated by the operation of said rapid traverse and feed clutch actuator motor upon movement of said clutch to feed engaged position to de-energize said actuator motor.

2. In a milling machine feed and rapid traverse transmission and control mechanism having a drive motor, a rapid traverse power take-off from said motor, a feed take-off drive from said motor including an infinitely variable speed V-belt drive transmission, a common feed and rapid traverse output drive shaft, clutch means associated with said shaft for applying a rapid traverse drive or a feed drive from said variable speed transmission to said shaft, and individual power transmissions connectable to said drive shaft for actuating the knee, saddle, and table members of said milling machine, an electric rapid traverse and feed clutch actuator motor connected to operate said clutch, and electric control switch means actuated by the operation of said rapid traverse and feed clutch actuator motor upon movement of said clutch to feed engaged position to de-energize said actuator motor, said transmissions interconnecting said output drive shaft to said knee, saddle, and table members including a disengaged clutch for each said saddle, knee, and table, individual electric actuator motors for shifting each of said clutches, and limit switch control mechanisms associated with each of said actuators to automatically stop operation of said actuators when they have shifted the respective clutch members to engaged or disengaged positions, and control lever means for each said knee, saddle, and table operable to adjust electric control and power supply apparatus to said clutch actuator motors whereby the manual operation of said motors effects power engagement or disengagement of said individual clutch devices for the knee, saddle, and table.

3. In a milling machine feed and rapid traverse transmission and control mechanism having a drive motor, a rapid traverse power take-off from said motor, a feed take-off drive from said motor including an infinitely variable speed V-belt drive transmission, a common feed and rapid traverse output drive shaft, clutch means associated with said shaft for applying a rapid traverse drive or a feed drive from said variable speed transmission to said shaft, and individual power transmissions connectable to said drive shaft for actuating the knee, saddle, and table members of said milling machine, an electric rapid traverse and feed clutch actuator motor connected to operate said clutch, and electric control switch means actuated by the operation of said rapid traverse and feed clutch actuator motor upon movement of said clutch to feed engaged position to de-energize said actuator motor, said transmissions interconnecting said output drive shaft to said knee, saddle, and table members including a disengaged clutch for each said saddle, knee, and table, individual electric actuator motors for shifting each of said clutches, and limit switch control mechanisms associated with each of said actuators to automatically stop operation of said actuators when they have shifted the respective clutch members to engaged or disengaged positions, and control lever means for each said knee, saddle, and table operable to adjust electric control and power supply apparatus to said clutch actuator motors whereby the manual operation of said motors effects power engagement or disengagement of said individual clutch devices for the knee, saddle, and table, and automatic trip dog control mechanism operable to control said electrical control and power supply mechanism for operating the rapid traverse and feed clutch actuator motor and the individual actuator motors for the disconnect clutches for the knee, saddle, and table in a predetermined sequential relationship.

4. In a milling machine feed and rapid traverse transmission and control mechanism having a drive motor, a rapid traverse power take-off from said motor, a feed take-off drive from said motor including an infinitely variable speed V-belt drive transmission, a common feed and rapid traverse output drive shaft, clutch means associated with said shaft for applying a rapid traverse drive or a feed drive from said variable speed transmission to said shaft, and individual power transmissions connectable to said drive shaft for actuating the knee, saddle, and table members of said milling machine, an electric rapid traverse and feed clutch actuator motor connected to operate said clutch, and electric control switch means actuated by the operation of said rapid traverse and feed clutch actuator motor upon movement of said clutch to feed engaged position to de-energize said actuator motor, said transmissions interconnecting said output drive shaft to said knee, saddle, and table members including a disengaged clutch for each said knee, saddle, and table, individual electric actuator motors for shifting each of said clutches, and limit switch control mechanisms associated with each of said actuators to automatically stop operation of said actuators when they have shifted the respective clutch members to engaged or disengaged positions, and control lever means for each said knee, saddle, and table operable to adjust electric control and power supply apparatus to said clutch actuator motors whereby the manual operation of said motors effects power engagement or disengagement of said individual clutch devices for the knee, saddle, and table, and automatic trip dog control mechanism operable to control said electrical control and power supply mechanism for operating the rapid traverse and feed clutch actuator motor and the individual actuator motors for the disconnect clutches for the knee, saddle, and table in a predetermined sequential relationship, and electrical interlock mechanism interrelated to the manually operated control mechanisms and the automatic trip control mechanisms to limit simultaneous operation of the knee, saddle, and table to predetermined sequences of operation.

5. In a milling machine feed and rapid traverse transmission and control mechanism having a mechanical drive transmission, including means for applying a feed and rapid traverse rate of power to the knee, saddle, and table mechanisms, and means including individual disconnect clutch mechanism for the knee, saddle, and table each operable by electric actuating devices, electric control switch means for automatically de-energizing said feed and rapid traverse actuator and said individual clutch disconnect actuators at the conclusion of their respective engagement or disengagement position of said clutches, and manual control lever means for actuating an electrical control circuit for operating said clutch actuators.

6. In a milling machine feed and rapid traverse transmission and control mechanism having a mechanical drive transmission, including means for applying a feed and rapid traverse rate of power to the knee, saddle, and table mechanisms, and means including individual disconnect clutch mechanism for the knee, saddle, and table each operable by electric actuating devices, electric control switch means for automatically de-energizing said feed and rapid traverse actuator and said individual clutch disconnect actuators at the conclusion of their respective engagement or disengagement position of said clutches, and manual control lever means for actuating an electrical control circuit for operating said clutch actuators, and electrical interlock mechanism operable by the simultaneous movement of said control levers to limit the operation of the machine to only a single actuable knee, saddle, or table member.

7. In a milling machine transmission and control mechanism, a reversible feed and rapid traverse drive motor, a change feed transmission driven by said motor, transmission mechanism connecting power from said change feed transmission to the knee, saddle, and table members including individual disconnect means for each of said knee, saddle, and table members, a drive transmission directly connectable from said reversible feed and rapid traverse drive motor to said last mentioned transmission, electrically actuated clutch means for connecting power from said change feed transmission or rapid traverse power directly from said motor to said mentioned transmission, electric actuator means for each of said individual disconnect means for the knee, saddle, and table, an electrical control circuit associated with the reversible feed and rapid traverse drive motor, a feed and rapid traverse clutch actuator, and the individual disconnect device actuators for the knee, saddle, and table, and manually operated lever control means associated with the knee, saddle, and table members each operable to regulate said electric control circuits so as to effect feed and rapid traverse movements in the knee, saddle, and table in either direction.

8. In a milling machine transmission and control mechanism, a reversible feed and rapid traverse drive motor, a change feed transmission driven by said motor, transmission mechanism connecting power from said change feed transmission to the knee, saddle, and table members including individual disconnect means for each of said knee, saddle, and table members, a drive transmission directly connectable from said reversible feed and rapid traverse drive motor to said last mentioned transmission, electrically actuated clutch means for connecting power from said change feed transmission or rapid traverse power directly from said motor to said mentioned transmission, electric actuator means for each of said individual disconnect means for the knee, saddle, and table, an electrical control circuit associated with the reversible feed and rapid traverse drive motor, the feed and rapid traverse clutch actuator, and the individual disconnect device actuators for the knee, saddle, and table members, and means operable to regulate said electric control circuit so as to effect feed and rapid traverse movements in the knee, saddle, and table in either direction, and electrical interlock mechanism controlled by the movement of said control levers to allow the operation of only a single one of said knee, saddle, or table members upon manipulation of said control levers.

9. In a milling machine transmission and control mechanism, a reversible feed and rapid traverse drive motor, transmission mechanism including a direct positive rapid traverse drive and a variable feed rate drive and clutch means for alternately applying one or the other of said drives to an output drive shaft, transmission mechanism including individual disconnect clutches for the knee, saddle, and table members of the milling machine, electric power operated actuators for each of said disconnect clutches, manual control levers each for the knee, saddle, and table members, an electrical control circuit including switching mechanism operated by said control levers for controlling the application of electric power to said reversible feed and rapid traverse drive motor, and an electric power actuator for the feed and rapid traverse clutch device, and the electric actuators for the knee, saddle, and table disconnect clutches.

10. In a milling machine transmission and control mechanism, a reversible feed and rapid traverse drive motor, transmission mechanism including a direct positive rapid traverse drive and a variable feed rate drive and clutch means for alternately applying one or the other of said drives to an output drive shaft, transmission mechanism including individual disconnect clutches for the knee, saddle, and table members of the milling machine, electric power operated actuators for each of said disconnect clutches, manual control levers each for the knee, saddle, and table members, an electrical control circuit including switching mechanism operated by said control levers for controlling the application of electric power to said reversible feed and rapid traverse drive motor, and trip dog actuated switch means also associated with said electric control circuit operable by the relative movement of the knee, saddle, and table members to effect an automatic sequential operation of said reversible feed and rapid traverse drive motor, the rapid traverse and feed clutch actuator, and the individual disconnect clutch actuators to effect an automatic cyclical operation of the machine.

11. In a milling machine transmission and control mechanism, a reversible feed and rapid traverse drive motor, transmission mechanism including a direct positive rapid traverse drive and a variable feed rate drive and clutch means for alternately applying one or the other of said drives to an output drive shaft, transmission mechanism including individual disconnect clutches for the knee, saddle, and table members of the milling machine, electric power operated actuators for each of said disconnect clutches, manual control levers each for the knee, saddle, and table members, an electrical control circuit including switching mechanism operated by said control levers for controlling the application of electric power to said reversible feed and rapid traverse drive motor, and trip dog actuated switch means also associated with said electric control circuit operable by the relative movement of the knee, saddle, and table members to effect an automatic sequential operation of said reversible feed and rapid traverse drive motor, the rapid traverse and feed clutch actuator, and the individual disconnect clutch actuators to effect an automatic cyclical operation of the machine, and common electrical interlock mechanism between said levers and the trip operated mechanisms for the knee, saddle, and table members effective at all times to prevent simultaneous operation of any two or more of said knee, saddle, and table members.

12. In a milling machine having a movable work holding member, a feed and rapid traverse transmission including a reversible drive motor adapted to actuate said work holding member, a disconnect clutch between said feed and rapid traverse transmission and said actuable member operated by an electric power motor for engaging and disengaging said disconnect clutch, and a control lever movable in the direction of desired travel of said work holding member, an electric circuit having switch means operable by said lever for applying power to said feed drive motor, said feed and rapid traverse actuator, and said disconnect clutch to effect feed and rapid traverse movements in said member in either direction or to stop said movement.

13. In a milling machine having a movable work holding member, a feed and rapid traverse transmission including a reversible drive motor adapted to actuate said work holding member, a disconnect clutch between said feed and rapid traverse transmission and said actuable member operated by an electric power motor for engaging and disengaging said disconnect clutch, and a control lever movable in the direction of desired travel of said work holding member, an electric circuit having switch means operable by said lever for applying power to said feed drive motor, said feed and rapid traverse actuator, and said disconnect clutch to effect feed and rapid traverse movements in said member in either direction or to stop said movement, switch means associated with said feed and rapid traverse actuator for arresting movement of said actuator upon the engagement of the feed drive power of said transmission, and switch means associated with the actuator for said disconnect clutch automatically effective to de-energize said actuator for the clutch when said motor has completed an engagement or a disengagement of the clutch as initiated by the movement of said control lever.

14. In a machine tool transmission and control mechanism for actuating and controlling the movement of the work holding member of the milling machine, the combination of a reversible feed and rapid traverse drive motor, transmission means associated with said motor for applying the feed or rapid traverse drive to the member to be actuated, power operated clutch mechanism for effecting feed or rapid traverse drive, a feed disconnect clutch between the output of said feed and rapid traverse drive and the member to be actuated, electric power means for engaging and disengaging said disconnect means, a control lever movable from a neutral position to each side thereof first to a detented position of feed in either direction and then to an undetented further position of rapid traverse movement in either direction where said lever upon release automatically returns to said feed positions, electric switch means actuated by said lever to effect operation of said feed and rapid traverse drive motor and the rapid traverse and feed clutch and disconnect clutch actuators, and switch means for automatically de-energizing the feed and rapid traverse clutch actuator when it has moved the clutch device to feed position, switch means for de-energizing said disconnect clutch actuator after it has moved the disconnect clutch either to fully engaged or fully disengaged position, and further switch means operated by said control lever when in neutral position to so energize said actuator for the disconnect clutch to cause said clutch to be maintained in a disconnected position, and switch means operated by the movement of said lever either side of neutral position to effect the reversal of operation of said feed and rapid traverse drive motor.

15. In a machine tool transmission and control mechanism for actuating and controlling the movement of the work holding member of the milling machine, the combination of a reversible feed and rapid traverse drive motor, transmission means associated with said motor for applying the feed or rapid traverse drive to the member to be actuated, power operated clutch mechanism for effecting feed or rapid traverse drive, a feed disconnect clutch between the output of said feed and rapid traverse drive and the member to be actuated, electric power means for engaging and disengaging said disconnect means, a control lever movable from a neutral position to each side thereof first to a detented position of feed in either direction and then to an undetented further position of rapid traverse movement in either direction where said lever upon release automatically returns to said feed positions, electric switch means actuated by said lever to effect operation of said feed and rapid traverse drive motor and the rapid traverse and feed clutch and disconnect clutch actuators, and switch means for automatically de-energizing the feed and rapid traverse clutch actuator when it has moved the clutch device to feed position, switch means for de-energizing said disconnect clutch actuator after it has moved the disconnect clutch either to fully engaged or fully disengaged position, and further switch means operated by said control lever when in neutral position to so energize said actuator for the disconnect clutch to cause said clutch to be maintained in a disconnected position, and switch means operated by the movement of said lever either side of neutral position to effect the reversal of operation of said feed and rapid traverse drive motor, and further disconnect clutch power actuators for said disconnect clutches and control levers for other movable machine tool members of said milling machine similarly effective to control the electric control circuit for energizing the feed and rapid traverse drive motor in either direction and to control said feed and rapid traverse drive clutch.

16. In a machine tool transmission and control mechanism for actuating and controlling the movement of the work holding member of the milling machine, the combination of a reversible feed and rapid traverse drive motor, transmission means associated with said motor for applying the feed or rapid traverse drive to the member to be actuated, power operated clutch mechanism for effecting feed or rapid traverse drive, a feed disconnect clutch between the output of said feed and rapid traverse drive and the member to be actuated, electric power means for engaging and disengaging said disconnect means, a control lever movable from a neutral position to each side thereof first to a detented position of feed in either direction and then to an undetented further position of rapid traverse movement in either direction where said lever upon release automatically returns to said feed positions, electric switch means actuated by said lever to effect operation of said feed and rapid traverse drive motor and the rapid traverse and feed clutch and disconnect clutch actuators, and switch means for automatically de-energizing the feed and rapid traverse clutch actuator when it has moved the clutch device to feed position, switch means for deenergizing said disconnect clutch actuator after it has moved the disconnect clutch either to fully engaged or fully disengaged position, and further switch means operated by said control lever when in neutral position to so energize said actuator for the disconnect clutch to cause said clutch to be maintained in a disconnected position, and switch means operated by the movement of said lever either side of neutral position to effect the reversal of operation of said feed and rapid traverse drive motor, and further disconnect clutch power actuators for said disconnect clutches and control levers for other movable machine tool members of said milling machine similarly effective to control the electric control circuit for energizing the feed and rapid traverse drive motor in either direction and to control said feed and rapid traverse drive clutch, and electrical interlock mechanism in said circuit rendered effective by the actuation of more than one of said control levers from a neutral position to prevent operation of all of said members in the event more than one of said levers are moved from a neutral position simultaneously.

17. In a milling machine transmission and control mechanism including a reversible feed and rapid traverse drive motor, a variable feed transmission driven from said motor, a feed and rapid traverse clutch, means for connecting the output of said variable feed transmission to said clutch, and means for directly connecting said reversible feed and rapid traverse drive motor to said clutch, a power feed and rapid traverse clutch actuator for shifting said feed and rapid traverse clutch, a disconnect clutch for the knee, saddle, and table members of said milling machine, means for connecting power output from said feed and rapid traverse clutch through said disconnect clutches to the knee, saddle, and table members, a power actuator for each of said disconnect clutches, a control lever for each of the knee, saddle, and table members, and an electric control circuit regulated by the operation of said control levers such that each control lever is effective to control the application of power to the actuator for the feed and rapid traverse clutch and for reversing or stopping said feed and rapid traverse motor while each lever is effective to control the power actuator for the disconnect clutch only for its respective knee, saddle, and table member.

18. In a milling machine transmission and control mechanism including a reversible feed and rapid traverse drive motor, a variable feed transmission driven from said motor, a feed and rapid traverse clutch, means for connecting the output of said variable feed transmission to said clutch, and means for directly connecting said reversible feed and rapid traverse drive motor to said clutch, a power feed and rapid traverse clutch actuator for shifting said feed and rapid traverse clutch, a disconnect clutch for the knee, saddle, and table members of said milling machine, means for connecting power output from said feed and rapid traverse clutch through said disconnect clutches to the knee, saddle, and table members, a power actuator for each of said disconnect clutches, a control lever for each of the knee, saddle, and table members, and an electric control circuit regulated by the operation of said control levers such that each control lever is effective to control the application of power to the actuator for the feed and rapid traverse clutch and for reversing or stopping said feed and rapid traverse motor while each lever is effective to control the power actuator for the disconnect clutch only for its respective knee, saddle, and table member, and electrical interlock control mechanism effective upon movement of more than one of said levers from a neutral position to automatically de-energize said reversible feed and rapid traverse drive motor.

19. In a feed and rapid traverse control mechanism for a milling machine having actuable knee, saddle, and table members, a control lever for each of said members each having a neutral position, feed and rapid traverse positions each side of said neutral position, electrical power means for actuating and for controlling the application of actuating power to said knee, saddle, and table members including, electrical interlock mechanism operated by the positioning of the control lever for the table member in feed and rapid traverse movement positions in either direction, and means actuated by the movement of the saddle control lever or the knee control lever to feed and rapid traverse positions to automatically discontinue the application of power to all knee, saddle, and table members.

20. In a feed and rapid traverse control mechanism for a milling machine having actuable knee, saddle, and table members, a control lever for each of said members each having a neutral position, feed and rapid traverse positions each side of said neutral position, electrical power means for actuating and for controlling the application of actuating power to said knee, saddle, and table members including electrical interlock mechanism operated by the positioning of the control lever in the saddle member for feed and rapid traverse movement positions in either direction, and means actuated by the movement of the table control lever or the knee control lever to feed and rapid traverse positions to automatically discontinue the application of power to all knee, saddle, and table members.

21. In a feed and rapid traverse control mechanism for a milling machine having actuable knee, saddle, and table members, a control lever for each of said members each having a neutral position, feed and rapid traverse positions each side of said neutral position, electrical power means for actuating and for controlling the application of actuating power to said knee, saddle, and table members including electrical interlock mechanism operated by the positioning of the control lever in the knee member for feed and rapid traverse movement positions in either direction, and means actuated by the movement of the saddle control lever or the table control lever to feed and rapid traverse positions to automatically discontinue the application of power to all knee, saddle, and table members.

22. In a milling machine transmission and control mechanism having a feed and rapid traverse drive motor for actuating the knee, saddle, and table members of the milling machine, a control lever for each of said knee, saddle, and table members movable from a neutral position to feed or rapid traverse positions in either direction either side of said neutral position, electrical control circuit means associated with said feed and rapid traverse drive motor including an emergency momentary contact stop button actuable to automatically de-energize said motor to stop operation of said knee, saddle, and table movements, and an electrical control device in said circuit to prevent again energizing said feed and rapid traverse drive motor until all of said control levers for the knee, saddle, and table members have been returned to neutral positions.

ALBERT KEITH WATCHER.
WILLIAM B. DULANEY.

REFERENCES CITED

The following references are of record in the file of this patent:

UNITED STATES PATENTS

| Number | Name | Date |
|---|---|---|
| 2,215,684 | Armitage | Sept. 24, 1940 |
| 2,240,973 | Armitage | May 6, 1941 |
| 2,382,934 | Armitage | Aug. 14, 1945 |
| 2,407,913 | Armitage et al. | Sept. 17, 1946 |
| 2,419,726 | Pelphrey | Apr. 29, 1947 |